Patented Nov. 1, 1938

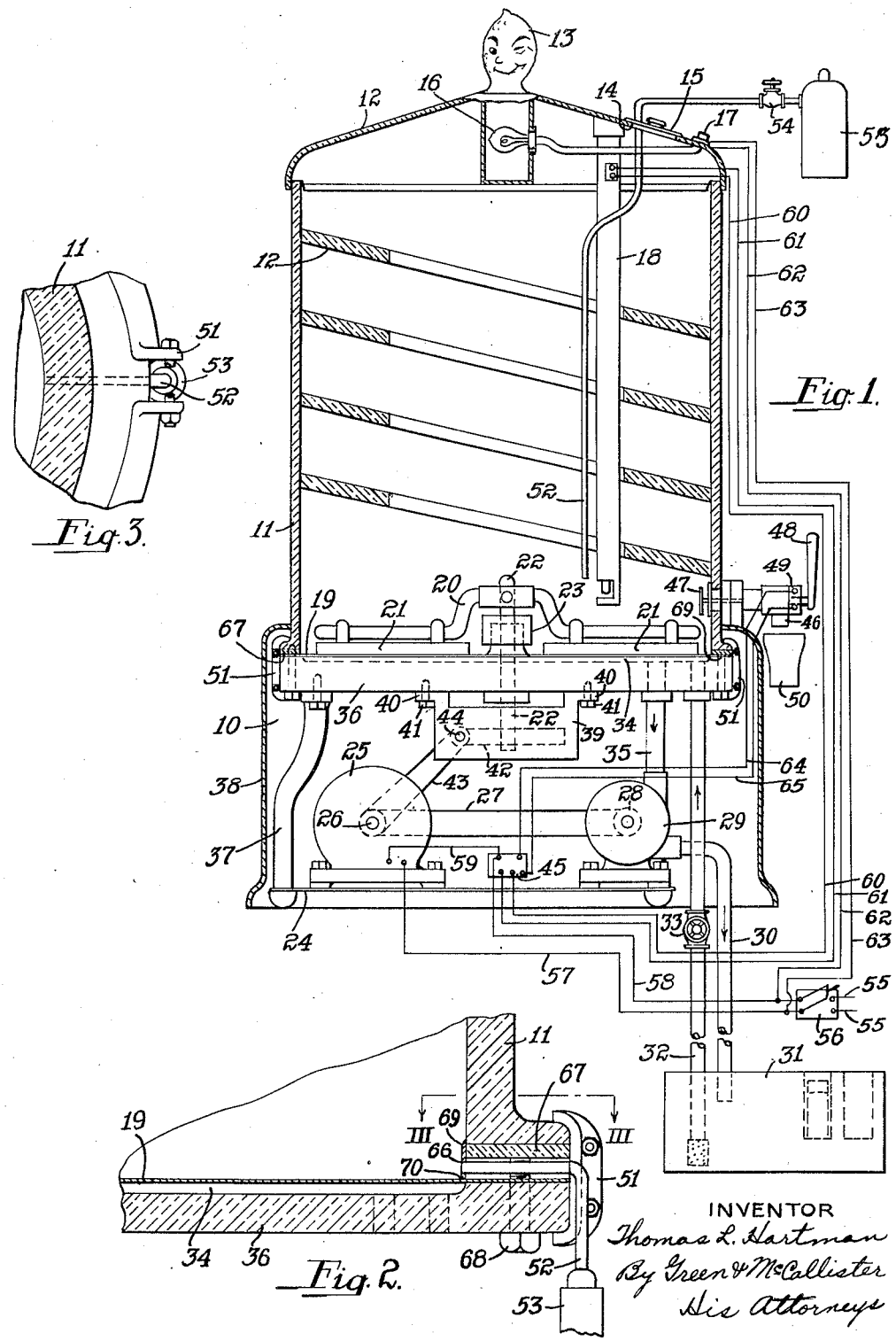

2,134,787

UNITED STATES PATENT OFFICE

2,134,787

METHOD OF AND APPARATUS FOR PREPARING BEVERAGES

Thomas L. Hartman, Pittsburgh, Pa., assignor of one-third to Harold M. Young, one-third to E. J. W. Keagy, both of Pittsburgh, Pa., and one-third to Reymer & Brothers, Inc., Pittsburgh, Pa., a corporation of Pennsylvania Application March 18, 1935, Serial No. 11,603

17 Claims. (Cl. 62—114)

My present invention relates to a method of and apparatus for preparing a beverage and for maintaining the same in prepared condition.

In an application filed by me on September 1, 1934, Serial No. 742,507, I have disclosed a method and apparatus for preparing a beverage of the same general nature as is prepared by my present invention, but in which no provision was made for maintaining a supply or stock of prepared beverage. The invention disclosed by me in my aforesaid application was also not adapted for features of automatic maintenance and control nor was it possible to carbonate the beverage there produced.

Previously known methods and apparatus are incapable of producing a beverage which is composed primarily of a mixture of water and flavoring ingredients together with a given or desired percentage of solid particles, such as soft frozen flakes. Such prior methods and apparatus produce either completely frozen products or products which contain such a large percentage of crystals or solid products that the products as a whole are stiff or hard and do not partake of the characteristics of a liquid, that is, they cannot flow and cannot be poured or otherwise dispensed like a liquid nor would they give a uniform proportion of solid to liquid.

One of the objects of my present invention is the production of a beverage and a method for making the same which shall be free from disadvantages and limitations such as those indicated above.

Another object resides in producing a beverage which has such characteristics as to viscosity that it is readily flowable and can be poured or dispensed in the manner of ordinary liquids.

A further object lies in a novel apparatus which makes it possible to produce such a beverage as is disclosed by the present application and it also is able to maintain the beverage in prepared condition as well as to build up a suitable supply of the beverage and dispense it as required, the dispensing operation being characterized by freedom from interference with the production and maintenance of the beverage.

An additional object resides in producing a carbonated beverage in a facile and economical manner.

Other and still further objects and advantages will be understood by those skilled in this art or will be pointed out hereinafter.

In the accompanying drawing, I have illustrated one form of apparatus by means of which the objects and advantages of the present invention can be realized and wherein:

Figure 1 is a view partly in elevation and partly in section of a beverage producing, storing, and vending apparatus in accordance with the present invention;

Fig. 2 is a detail partly in elevation and partly in vertical section showing a modified arrangement for introducing carbon dioxide into the beverage; and Fig. 3 is a plan view partly in section showing the carbonating tube and clamp arrangement of Fig. 2.

Corresponding numerals indicate similar parts in the various views.

In general, I have found that certain types of beverages were not heretofore conveniently made, stored or dispensed in economical manner or in a manner which would provide an instant supply of the beverage for use in its best condition. Such beverages were usually frozen to a too-hard condition which resulted in inability to provide a serving of such beverage when requested and also in many instances resulted in the loss of one or more sales because the beverage would be in a completely frozen, and hence solid condition due to the nature of its production and storage and in such condition that it could not be, of course, dispensed.

In order to prevent the beverage from being completely frozen one must from time to time inspect the condition of the beverage in the freezer compartment and if freezing is excessive the supply of beverage must be changed to a warmer atmosphere; here again inspection must take place from time to time to see if too much solid has melted and if so there must be a removal back to the freezing compartment; in other words, frequent inspection and removals must be made. This is very troublesome, consumes time and increases the cost of dispensing the beverage. In other cases, the beverages were not in proper condition for serving because they had not yet been provided with their requisite proportion of frozen particles. Under such circumstances it has been a more or less prevailing custom to serve the beverage with ordinary ice and this detracts greatly from the beverage and is not at all what was intended.

Referring now to Fig. 1, especially, the apparatus illustrated comprises any suitable base or support member (not shown) upon which is supported or suspended a compartment or section 10 containing the mechanism involved and superimposed upon which compartment is the beverage reservoir 11. Referring to the reservoir 11 first, this is preferably made in the nature of an open-ended cylinder and is preferably made of transparent material such as glass so that the contents of the reservoir shall be visible at all times. This reservoir may be provided with a helix 12 which is submerged in the beverage in the reservoir and which acts to aid in diffusing solid particles when formed, to maintain the supply of beverage in a homogeneous condition and to prevent excessive movement or agitation of the beverage. This helix or spiral, therefore, also acts as a baffle and as usually utilized the helix is solid adjacent the reservoir and providing a central passage up through the center.

The underside of the helix or spiral also acts as a baffle to stop the frozen flakes from floating to the top surface of the beverage when the scraper diffuser is not operating. This, therefore, causes the flakes to be held in position through a greater part of the beverage and the time period of withdrawing a serving of beverage is reduced to a minimum. The reservoir 11 is provided with a suitable top or cover plate 11a which may be of any suitable material and which may be provided with a center portion 13 in a form which is at least suggestive of the beverage made and dispensed in any particular apparatus. As shown, the aforesaid portion represents a lemon frequently provided, however, with features more or less representing a human face. This top or cover 11a is provided with a suitable aperture 14 for placing the raw materials in the reservoir and such aperture is provided with a closure 15 of any convenient form. The cover 11a is also usually provided with a source of illumination as indicated at 16 which may be controlled by a suitable flasher 17 on the cover 11a or elsewhere. This source of illumination may be a constant source, that is, it may shine continuously or it may be turned on and off by the flasher switch 17.

Projecting downwardly into the beverage reservoir and preferably terminating near the lower end thereof and in the zone which will hereinafter be termed the cold zone is a thermostatic temperature controlling element 18. This thermostatic element may consist of any desired or known structure as long as it is capable of controlling, in a manner to be hereinafter stated, the temperature of the beverage so as to prevent material variation thereof. This thermostatic element may, for example, be in the form of a thermometer so constructed and arranged that when the column of mercury, alcohol or expanding liquid thereof rises to a certain temperature an electrical contact is made which establishes an electric circuit. The thermostatic element may also consist of a sensitive bimetallic construction wherein the rate of expansion of two dissimilar metals acts to flex the bimetallic element so as to make contact upon a predetermined flexure thereof. For example, I prefer to maintain the beverage at 26° F. If the temperature rises to 26.5° F. the element 18 operates.

The bottom of the beverage reservoir is constituted of stainless metal or the like 19 and acts, in the manner to be explained, as a freezing surface. Mounted centrally of this bottom surface 19 is an agitator 20 which is provided with a number of scraper blades 21 to remove frozen particles from the freezing surface 19. The agitator is suitably operated by and attached to a shaft 22 which, via a stuffing box 23 extends downwardly into the machine compartment heretofore referred to and designated by the numeral 10.

Mounted or suspended on a suitable base support 24 is a suitable prime mover 25 such as an electric motor. The shaft 26 of this motor is provided with suitable pulleys. A belt 27 of suitable material passes over one of such pulleys and over a pulley 28 mounted on a pump 29 herein termed a centrifugal pump. This pump is, therefore, driven by the electric motor 25 through the belt 27. The pump is also suitably mounted or suspended on the support base 24. The pump 29 has a pipe 30 leading to a brine cabinet or the like 31 which acts as a refrigerating chest in that it extracts heat from the brine or other liquid used for beverage freezing purposes. Such a device is provided with automatic refrigerating means such as is common in automatic ice boxes and so-called brine or ice cream cabinets. Leading from said cabinet 31 is a pipe 32 provided intermediate its ends with a control valve 33 which leads to what I call a refrigerating reservoir 34 located just below freezing surface 19 and taking the form of a relatively shallow chamber or compartment. Leading from such refrigerating reservoir and connecting the same with the intake side of the pump 29 is a pipe connection 35. A Bakelite or the like member 36 provides the chamber 34 in its upper surface.

The numeral 37 indicates support legs for the usual purposes or the machine compartment cover 38 may act as supporting legs. Depending from the underside of the member 36 a speed reducing gear box 39 is supported by suitable brackets 40, 40 and screws or bolts 41. This gear box 39 is provided in known manner with a suitable reducing gear 42 and shaft 22 of agitator 20 extends down into said gear box and is controlled as to speed by said gear. The gear is driven by a belt 43 which drives a suitable worm gear 44 in the gear box 39 and which belt is driven by the electric motor 25. There is provided a suitable relay diagrammatically illustrated and designated by the numeral 45.

Set into the beverage reservoir 11 near the lower portion thereof is a suitable dispensing tube 46, controlled by a plunger 47 in known manner. The dispensing is controlled by a suitable handle 48 which, when pressed upon for the purpose of dispensing beverages, first makes an electric contact through switch 49 thereby starting the motor 25 and hence the agitator 20 to stir the beverage and thus prevent the withdrawal of a serving or sample which does not represent the average composition of the beverage, and then opens the tube 46. When released the reverse operations occur, namely, the dispensing tube is closed, and then the circuit broken. As shown, a suitable container 50 may be held or supported beneath the dispensing tube 46 to receive the serving of beverage.

In order to maintain the reservoir and freezing compartment in proper operative association clamps or bolts 51, or both, are utilized to hold together snugly the bottom of the beverage reservoir and the Bakelite member 36 in which the refrigerating chamber 34 is formed. As will also be apparent from the drawings, a suitable tubing 52 passes into the beverage reservoir 11 and terminates in the cold zone, that is, adjacent or near the freezing surface 19. This tubing leads from a source or supply of carbon dioxide 53 under pressure and is, of course, provided with a suitable valve 54 for controlling the admission of carbon dioxide to the beverage. In this manner the beverage can be carbonated not only directly in the beverage reservoir, but at approximately its coldest area, thus permitting a high degree of carbonation in a simple economical manner.

From the wiring diagram of Fig. 1, it will be understood that current enters from a suitable source through wires 55. Numeral 56 represents a switch by means of which the apparatus is connected for operation or rendered inoperative as desired. Wire 57 leads from switch 56 to motor 25. Wire 58 leads from switch 56 to relay 45. Wire 59 leads from motor 25 to relay 45. Wires 60, 61 lead from thermostatic device 18 to relay 45. Wires 62, 63 lead from light source 16 through flasher 17 (optional) and are connected to wires 58, 57 by being tapped thereinto. Finally, wires 64, 65 lead from switch 49 to relay 45.

In Figs. 2 and 3, I have illustrated a somewhat different manner of introducing the carbon dioxide gas into beverage reservoir 11. In this case, a space 66 is left between packing 67 and stainless steel disc or freezing surface 19 as determined, for example, by the bolt 68. Discharge tube 52 for the carbon dioxide passes through this space. The end is held in place by a piece of suitable metal 69 welded in position as at 70. Figs. 1 and 2 clearly show the shallow nature of chamber 34 in which cold brine is circulated at high velocity and thus effecting rapid heat exchange through member 19, the short intense cooling effect producing soft frozen flakes in contrast to hard dense crystals such as would otherwise be produced.

In following or practicing the present invention, the materials composing the beverage are charged into the reservoir, usually through opening 14. The beverage at this stage is usually merely a mixture of water and flavoring ingredients and is not in intended condition for consumption. The reservoir is filled to the desired extent with the mixture. Switch 56 is closed, if open. If the thermostatic element 18 is already in place it will, of course, immediately start motor 25. In those cases where a thermostatic element is not used the motor is started manually. The operation of motor 25 causes pump 29 to create a partial vacuum or suction in refrigerating chamber 34. This causes refrigerant as brine, etc. to pass up through pipe 32 into chamber 34. This refrigerant being cold and at a temperature below the freezing point of water causes beverage contacting refrigerating surface 19 to freeze, that is, to form a more or less flaky deposit on the refrigerating surface described above. This deposit, however, is removed as formed by the agitator with its scraper blades and caused to intermingle with the supply of beverage in the reservoir 11. This is continued until the beverage has been suitably lowered in temperature and has dispersed through it a predetermined proportion of soft frozen flakes, the manner in which the flakes are formed and dispersed preventing them from forming hard dense ice crystals. The proportion of soft frozen crystals to the beverage may, of course, vary within any desired limits, but I do not permit the proportion of frozen flakes to become so great that the beverage does not have the flowing characteristics of a liquid. The preferred proportion of solids is such that the beverage will still flow readily. The carbonation is provided directly to the beverage in its process of preparation by discharging carbon dioxide under pressure into the beverage at or about the coldest point or area of such beverage. This is done because a greater degree of carbonation can be attained in this manner and because the solubility of carbon dioxide in the beverage increases at lower temperatures. It is possible to discharge the carbon dioxide in close proximity, relatively speaking, to the refrigerating surface, if desired, which may also appropriately be called heat exchanger surfaces. (See Fig. 2.) The brine or other refrigerant circulates through the refrigerating reservoir 34 at a relatively rapid rate, that is, at a high velocity and hence there is a rapid local cooling and freezing of the beverage and the flakes formed are what I term soft flakes being more in the nature of "slush".

The flakes are not hard dense crystals such as are formed by the relatively slow or ordinary freezing of water. As the flakes are formed they are removed by the scraper and agitator and mixed with the beverage and these operations are allowed to continue until the desired or predetermined proportion of soft frozen flakes is dispersed through the beverage. When such a point is reached the production of the beverage is complete and is now ready for instant sale or for dispensing a liquid beverage containing a desired percentage of soft frozen flakes and the whole retaining the flowing characteristics of a liquid. Such beverage is likewise fully carbonated, although carbonation may be omitted, if desired.

Assuming that no withdrawals of beverage are made at this time, there will be a natural tendency for heat to leak into the beverage, flakes to melt and hence to raise the temperature of the beverage and such does occur. When the temperature has risen a predetermined amount, however, e. g., from 26° to 26.5° F., the thermostatic element 18 sets the apparatus into operation again with the result that the temperature of the beverage is again lowered and more soft frozen flakes are made in and intermixed with the beverage, whereupon operations again cease when the predetermined point is reached. If no withdrawals of beverage are made this continues indefinitely. This enables me to maintain an adequate supply of pre-conditioned beverage ready for use at all times.

It is also noteworthy that if it is desired to dispense beverage during the time that the apparatus is operating to build up the proportion of soft frozen flakes this can be done without affecting the apparatus or method in any way, and due to the spiral baffle and the location in which the beverage is withdrawn from the reservoir an average or typical sample will always be dispensed.

When the proportion of soft frozen flakes has been built up as desired or required, and hence when the apparatus is not in operation, the act of dispensing the beverage automatically restarts the apparatus and insures that an average or typical sample of beverage will be dispensed. When hand lever 48 is pushed or pressed inwardly to operate the plunger in the dispensing tube, the first thing that occurs is that an electric contact is made at switch 49 which causes motor 25 to start operating and hence to turn agitator 20. This causes a stirring of the beverage to insure that a proper sample be dispensed and the latter part of the movement of the hand lever 48 causes the conditioned beverage to be dispensed into a suitable receptacle, such as 50. Conversely, when the pressure is removed from the hand lever 48 the dispensing tube closes and the action of the motor continues or not, depending upon whether the beverage is in fully prepared condition or whether the act of dispensing has brought about such a change in conditions as will automatically set the apparatus into operation again.

The above is intended more in an illustrative than in a limitative sense and I do not intend to be limited to the foregoing details other than as required by the subjoined claims. I reserve the right to make modifications, substitutions, variations and additions both to the method and apparatus so long as they adhere to the principles and scope of my invention. I may, for example, omit the gear reduction box 39 in such cases where it is not needed. The baffle 12 may be vertical or the reservoir may be square or rectangular so that no baffle need be required. I may, moreover, cool or chill the beverage in a separate container before charging it into reservoir for conditioning and storage purposes and such prior treatment may or may not include carbonation. It is understood that the beverage reservoir 11 and/or any of its parts may be made of any suitable material and/or in the representation of any suitable products either natural or artificial, such as lemons, oranges, grapes, tomatoes or other natural products or some suitable configuration for use with such drinks as Coca-cola, Moxie, root beer, gingerale or the like. The use of light sources for constant or flashing illumination may or may not be used as circumstances indicate and such, of course, superimpose no limitations upon the invention.

What I claim as new and desire to secure by Letters Patent is:

1. In an apparatus of the kind described, a beverage reservoir, a heat exchange surface forming the bottom thereof, means for forming a frozen layer on said heat exchange surface, a scraper-agitator operating on said surface and releasing soft frozen flakes from the frozen layer thereon and means controllable by the temperature of the beverage in the reservoir for operating the frozen-layer-forming means and said scraper-agitator.

2. In an apparatus of the kind described, a beverage reservoir, a heat exchange surface forming the bottom thereof, means for forming frozen beverage on said surface, means for releasing the frozen beverage in the form of soft frozen flakes, means for disseminating the flakes and means for maintaining the beverage in the reservoir in prepared condition.

3. A method of conditioning a beverage mixture comprising confining a mass of such mixture, subjecting the bottom of such mass to intense refrigeration to form frozen mixture, breaking up the frozen mixture as it is formed to release soft frozen flakes therefrom, disseminating the flakes through the mass and continuing the freezing, breaking up and disseminating until the mass of mixture is reduced to a temperature below the melting point of such flakes.

4. A method of conditioning a beverage mixture comprising confining a mass of such mixture, subjecting the bottom of such mass to intense refrigeration to form frozen mixture, breaking up the frozen mixture as it is formed to release soft frozen flakes therefrom, disseminating the flakes through the mass, introducing $CO_2$ gas adjacent the bottom of the mass of beverage mixture, and continuing the freezing, breaking up and disseminating until the mass of mixture is reduced to a temperature below the melting point of such flakes.

5. A method of conditioning a beverage mixture comprising subjecting a mass of such mixture to a quick freezing at its bottom, breaking up the frozen mixture formed thereby to release soft frozen flakes therefrom and disseminating such flakes throughout the mass until the temperature of the mass is below the melting point of the flakes and until the proportion of flakes in the mass is such that a slushy beverage is produced.

6. A method of conditioning a beverage mixture comprising subjecting a mass of such mixture to a quick freezing at its bottom, breaking up the frozen mixture thereby formed to release soft frozen flakes therefrom and disseminating such flakes throughout the mass until the temperature of the mass is below the melting point of the flakes and until the proportion of flakes in the mass is such that a slushy beverage is produced, and introducing $CO_2$ gas adjacent the bottom of the mass of beverage mixture during the conditioning operations.

7. An apparatus of the kind described comprising a machine compartment and a superjacent reservoir, a non-metallic member therebetween which is provided with a shallow refrigerating chamber in its upper surface, a stainless metal member which forms the bottom of the reservoir and the top of the refrigerating chamber, a scraper-agitator mounted to operate on the stainless metal member, means for operating the scraper-agitator and means for circulating refrigerant through the refrigerating chamber in contact with the underside of the stainless metal member at a relatively rapid rate.

8. An apparatus of the kind described comprising a machine compartment, a superjacent reservoir, a member therebetween having a shallow chamber in its upper surface, a member having a high rate of heat transfer forming the bottom of the reservoir and the top of the shallow chamber, and means for circulating a refrigerant through said shallow chamber in contact with the underside of the high heat transfer member.

9. An apparatus of the kind described comprising a machine compartment, a superjacent reservoir, a member therebetween having a shallow chamber in its upper surface, a member having a relatively high rate of heat transfer forming the bottom of the reservoir and the top of the shallow chamber, and means for circulating a refrigerant through said shallow chamber in contact with the underside of the high heat transfer member, said first named member being of considerable thickness and composed of a material having a relatively low rate of heat transfer.

10. Apparatus of the kind described comprising a machine compartment, a superjacent reservoir, a member therebetween having a shallow chamber in its upper surface, a member having a high rate of heat transfer forming the bottom of the reservoir and the top of the shallow chamber, and means for circulating a refrigerant through said shallow chamber in contact with the underside of the high heat transfer member together with a scraper-agitator operating on the upper surface of said high heat transfer member.

11. In an apparatus of the character described, a relatively thick member having low heat transfer characteristics and having a shallow chamber in its upper surface, refrigerant inlet and outlet connections for such chamber, a relatively thin metal member having high heat transfer characteristics forming a top for said shallow chamber and a scraper-agitator unit operable on the upper surface of said metal member.

12. In an apparatus of the character described, a relatively thick member having low heat transfer characteristics and having a shallow chamber in its upper surface, refrigerant inlet and outlet connections for such chamber, a relatively thin metal member having high heat transfer characteristics forming a top for said shallow chamber and a scraper-agitator unit operable on the upper surface of said metal member, together with means for circulating refrigerant at a rapid rate through said shallow chamber in contact with the underside of the metal member and for actuating said scraper-agitator unit.

13. In an apparatus of the character described, a relatively thick member having low heat transfer characteristics and having a shallow chamber in its upper surface, refrigerant inlet and outlet connections for such chamber, a relatively thin metal member having high heat transfer characteristics forming a top for said shallow chamber and a scraper-agitator unit operable on the upper surface of said metal member, the low heat transfer member being composed of a non-metallic material such as "Bakelite."

14. In an apparatus of the character described, a relatively thick member having low heat transfer characteristics and having a shallow chamber in its upper surface, refrigerant inlet and outlet connections for such chamber, a relatively thin metal member having high heat transfer characteristics forming a top for said shallow chamber and a scraper-agitator unit operable on the upper surface of said metal member, together with means for introducing $CO_2$ adjacent the scraper-agitator unit.

15. In an apparatus of the character described, a relatively thick member having low heat transfer characteristics and having a shallow chamber in its upper surface, refrigerant inlet and outlet connections for such chamber, a relatively thin metal member having high heat transfer characteristics forming a top for said shallow chamber and a scraper-agitator unit operable on the upper surface of said metal member, together with means for introducing $CO_2$ adjacent the scraper-agitator unit, means for circulating refrigerant at a relatively rapid rate through said shallow compartment in contact with the underside of the metal member and means for actuating said scraper-agitator unit.

16. An apparatus of the character described comprising a machine compartment, a superjacent reservoir, a non-metallic member having low heat transfer characteristics therebetween and having a shallow chamber in its upper surface, a stainless metal plate member of high heat transfer characteristics forming the bottom of the reservoir and the top of the shallow chamber, a scraper-agitator operating on the top surface of the metal plate member, a shaft for said scraper-agitator passing, via a stuffing box, through the non-metallic member into the machine compartment, a gear on the lower end of said shaft, a worm gear meshing with said first gear, an electric motor mounted in said machine compartment, means for driving said worm gear from said electric motor, refrigerant inlet and outlet connections for said shallow chamber, a pump for circulating refrigerant through said shallow chamber at a relatively rapid rate, means for driving said pump from said electric motor, means for discharging $CO_2$ adjacent the scraper-agitator, temperature-responsive means in said reservoir electrically connected to said motor for actuating said motor in response to a predetermined rise in temperature of said temperature-responsive means, and a dispensing device associated with said reservoir near the bottom thereof and electrically interconnected with said electric motor to actuate the scraper-agitator preliminary to effecting withdrawal of beverage from the reservoir.

17. An apparatus of the character described comprising a machine compartment, a superjacent reservoir, a non-metallic member having low heat transfer characteristics therebetween and having a shallow chamber in its upper surface, a stainless metal plate member of high heat transfer characteristics forming the bottom of the reservoir and the top of the shallow chamber, a scraper-agitator operating on the top surface of the metal plate member, a shaft for said scraper-agitator passing, via a stuffing box, through the non-metallic member into the machine compartment, a gear on the lower end of said shaft, a worm gear meshing with said first gear, an electric motor mounted in said machine compartment, means for driving said worm gear from said electric motor, refrigerant inlet and outlet connections for said shallow chamber, a pump for circulating refrigerant through said shallow chamber at a relatively rapid rate, means for driving said pump from said electric motor, means for discharging $CO_2$ adjacent the scraper-agitator, temperature-responsive means in said reservoir electrically connected to said motor for actuating said motor in response to a predetermined rise in temperature of said temperature-responsive means, a dispensing device associated with said reservoir near the bottom thereof and electrically interconnected with said electric motor to actuate the scraper-agitator preliminary to effecting withdrawal of beverage from the reservoir and baffles disposed within said reservoir to oppose stratification of the beverage.

THOMAS L. HARTMAN.